(12) United States Patent
Kaplinsky

(10) Patent No.: US 7,680,192 B2
(45) Date of Patent: Mar. 16, 2010

(54) MULTI-SENSOR PANORAMIC NETWORK CAMERA

(75) Inventor: Michael Kaplinsky, Sierra Madre, CA (US)

(73) Assignee: Arecont Vision, LLC., Glendale, CA (US)

( * ) Notice: Subject to any disclaimer, the term of this patent is extended or adjusted under 35 U.S.C. 154(b) by 1158 days.

(21) Appl. No.: 10/890,912

(22) Filed: Jul. 14, 2004

(65) Prior Publication Data

US 2005/0141607 A1  Jun. 30, 2005

Related U.S. Application Data

(60) Provisional application No. 60/486,928, filed on Jul. 14, 2003.

(51) Int. Cl.
H04N 7/12 (2006.01)
H04N 11/02 (2006.01)
H04N 7/00 (2006.01)

(52) U.S. Cl. ............... 375/240.2; 375/240.12; 375/240.19; 348/36

(58) Field of Classification Search ............ 375/240.2, 375/240.12, 240.19; 348/36
See application file for complete search history.

(56) References Cited

U.S. PATENT DOCUMENTS

| | | | | |
|---|---|---|---|---|
| 5,200,818 A | * | 4/1993 | Neta et al. ............... | 348/39 |
| 5,422,672 A | * | 6/1995 | Horst et al. .............. | 375/240.12 |
| 5,926,218 A | * | 7/1999 | Smith .................... | 348/207.99 |
| 6,323,906 B1 | * | 11/2001 | Kobayashi et al. ......... | 348/441 |
| 6,618,074 B1 | * | 9/2003 | Seeley et al. ............. | 348/143 |
| 6,738,421 B1 | * | 5/2004 | Ueno .................... | 375/240.01 |
| 7,015,925 B2 | * | 3/2006 | Ford et al. ............... | 345/591 |
| 7,023,913 B1 | * | 4/2006 | Monroe .................. | 375/240.01 |
| 7,215,364 B2 | * | 5/2007 | Wachtel et al. ........... | 348/218.1 |
| 2002/0097322 A1 | * | 7/2002 | Monroe et al. ............ | 348/159 |

* cited by examiner

*Primary Examiner*—Tung Vo
*Assistant Examiner*—Anner Holder
(74) *Attorney, Agent, or Firm*—Christie, Parker & Hale, LLP.

(57) ABSTRACT

A multi-sensor network camera providing up to 360 degrees angle of view. The includes multiple image sensors with individual optics, one or more image processors, compression units and network interfaces mounted in the single housing. The image sensors are positioned in non-parallel planes, cumulatively providing panoramic field of view and image streams originating from all sensors share the same image compression and network interface hardware, providing for low cost implementation. The images from all sensors are transmitted over the network simultaneously via packet interleaving, with appropriate bandwidth reduction achieved by image decimation. Simultaneously with transmission of decimated images from all sensors, full resolution window or entire image of one or more sensors may also transmitted, where the selection of contents is based on motion detection or user setting.

12 Claims, 6 Drawing Sheets

Block diagram of Panoramic Network Camera System

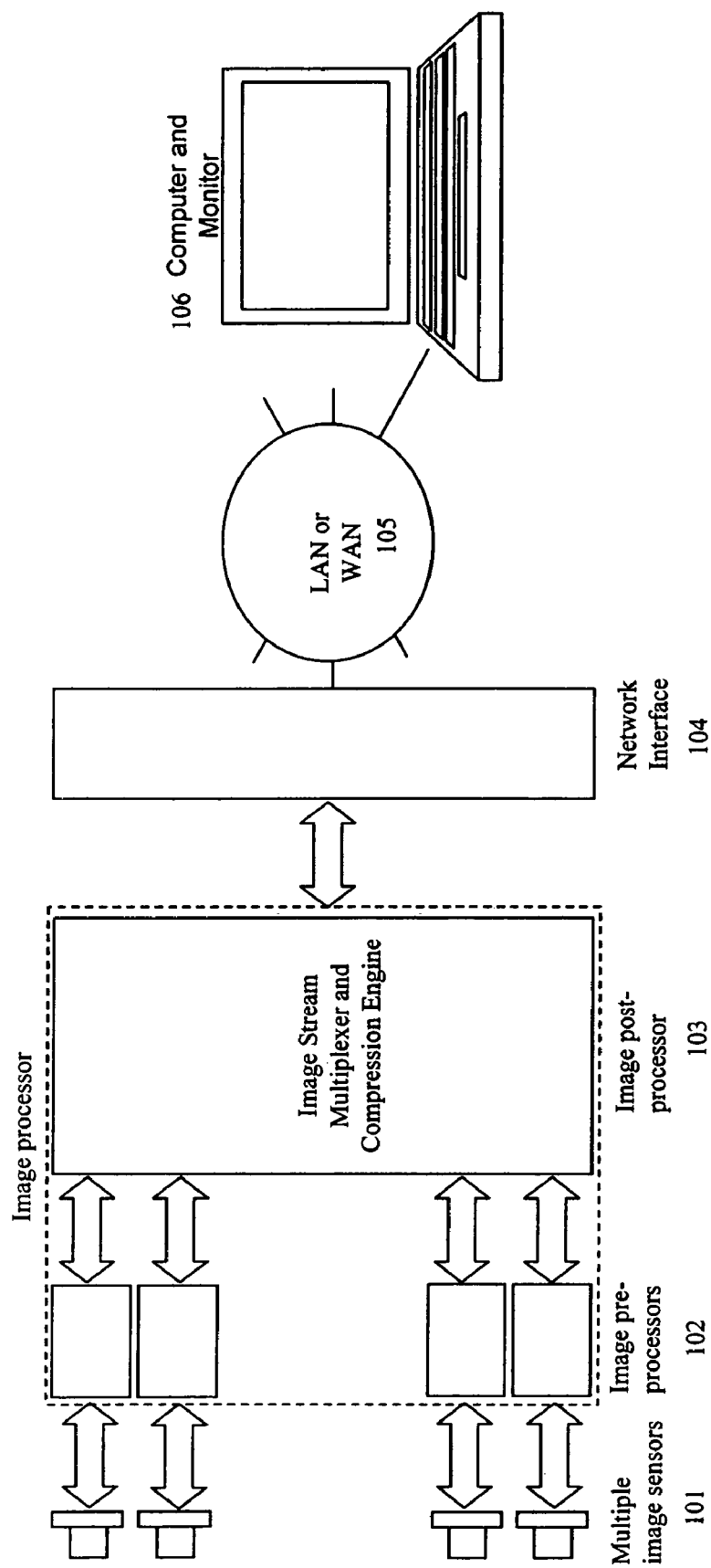
Figure 1. Block diagram of Panoramic Network Camera System

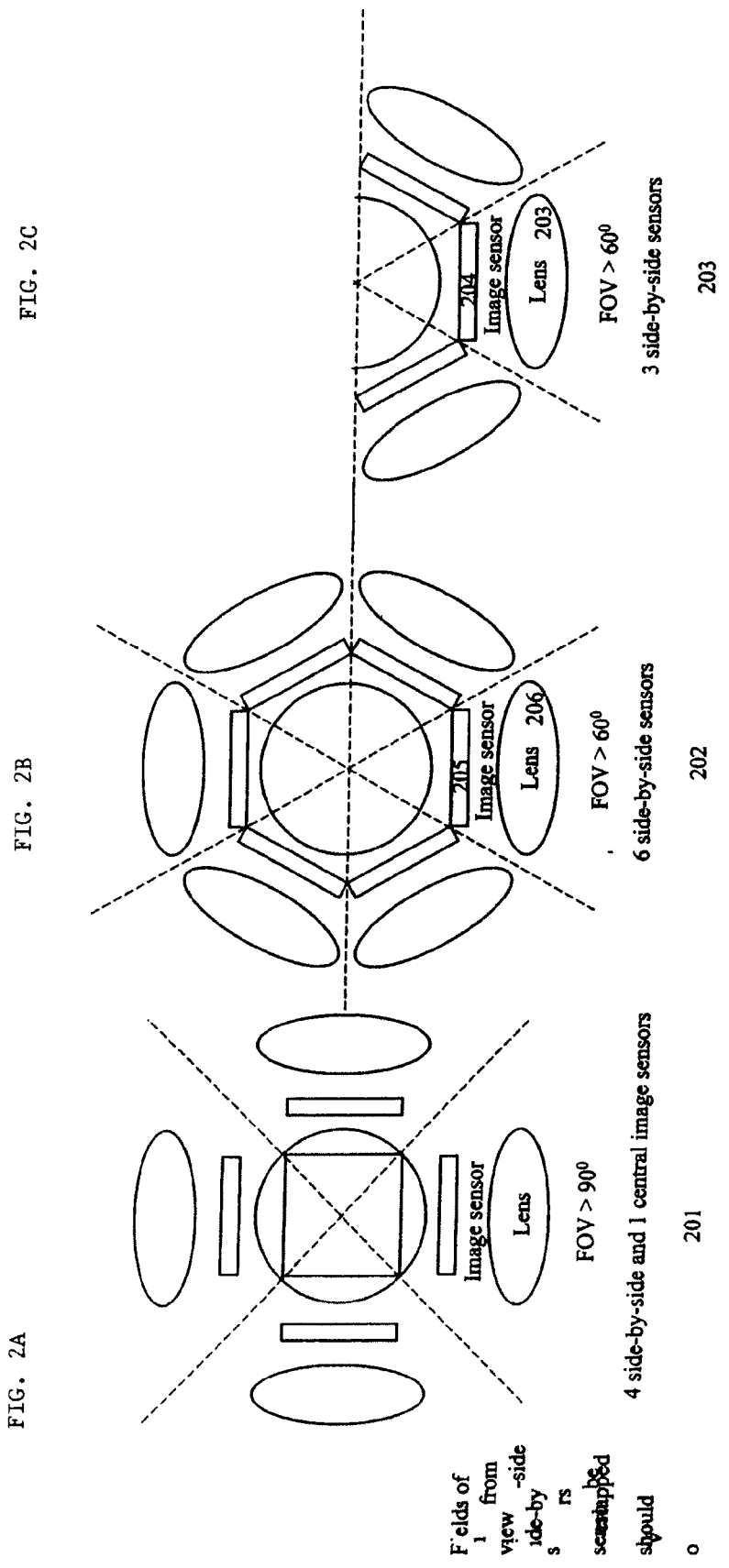

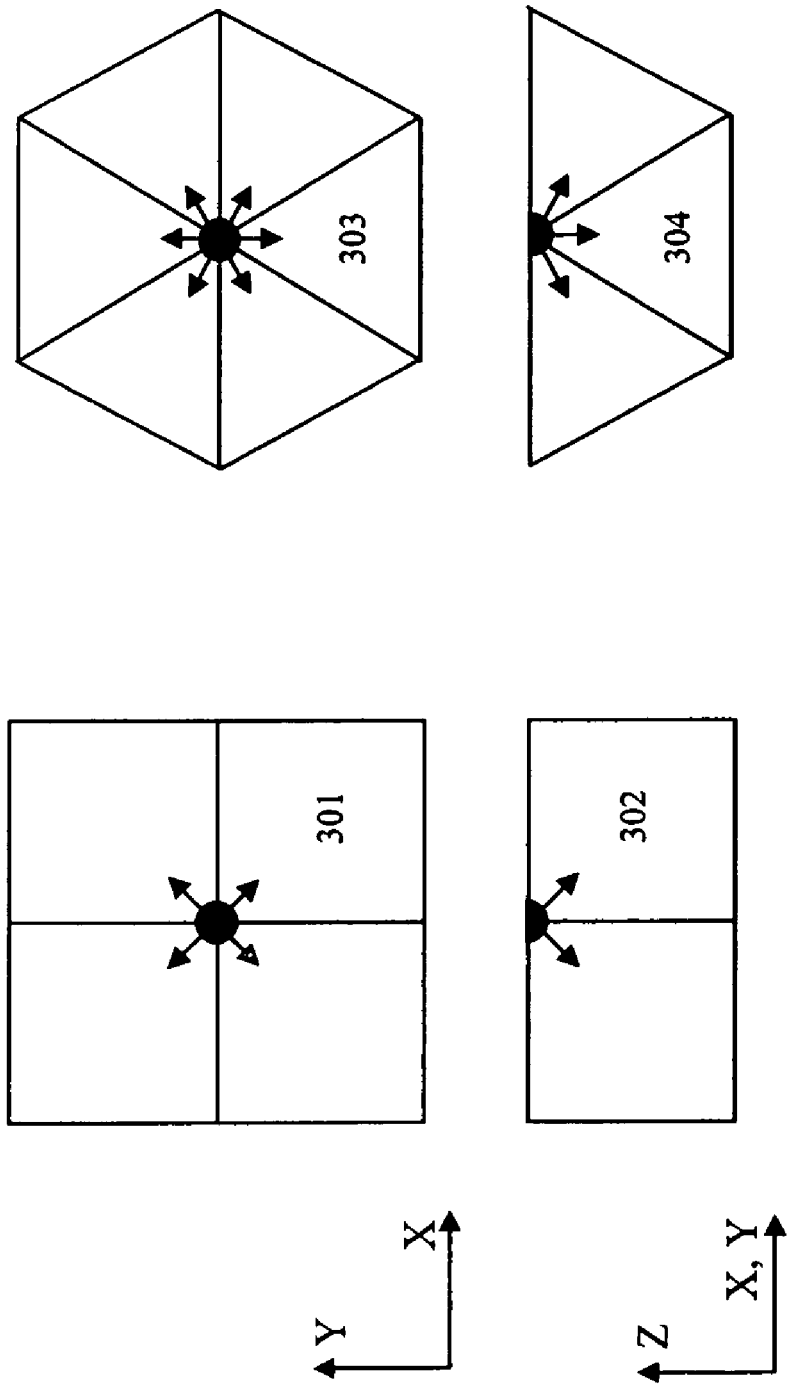
Figure 3. Multi-sensor panoramic network camera cross-sections

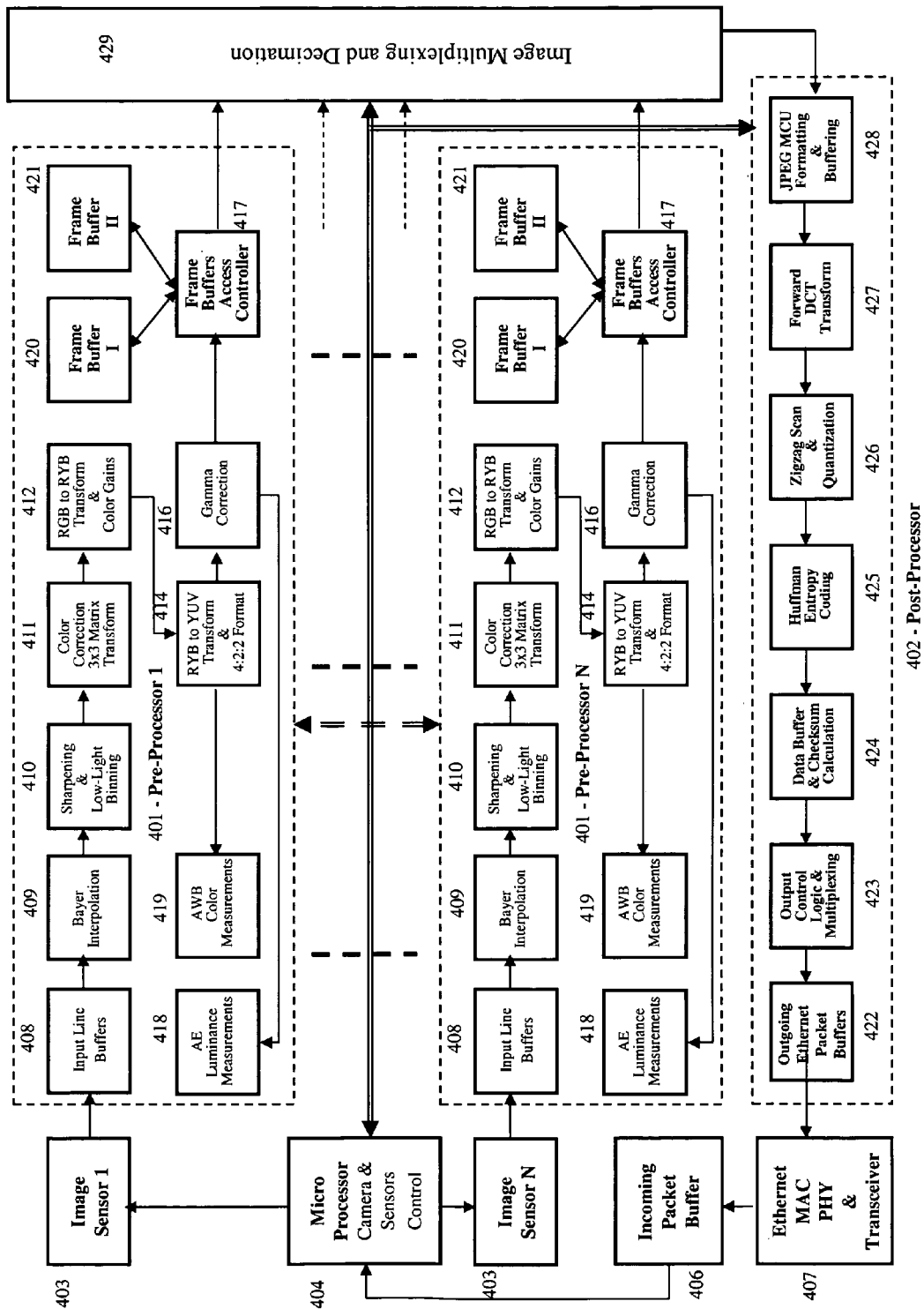
Figure 4    Block Diagram of Multi-Sensor Panoramic Network Camera

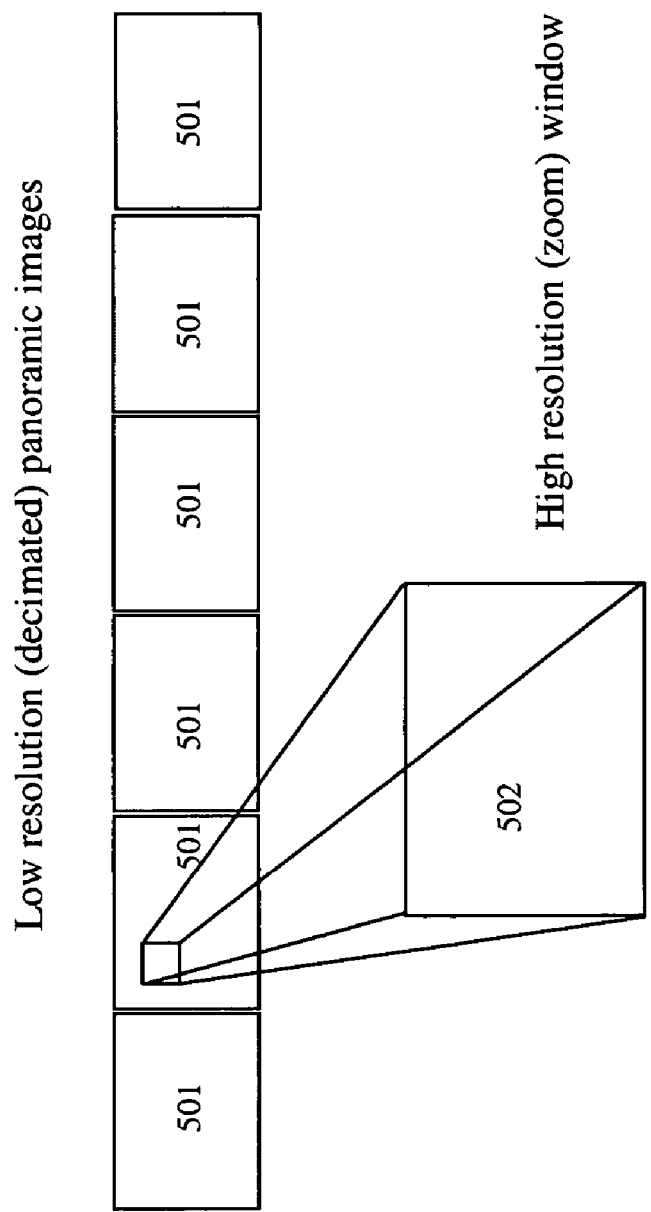
Figure 5. Transmission and visualization of images from multi-sensor panoramic network camera

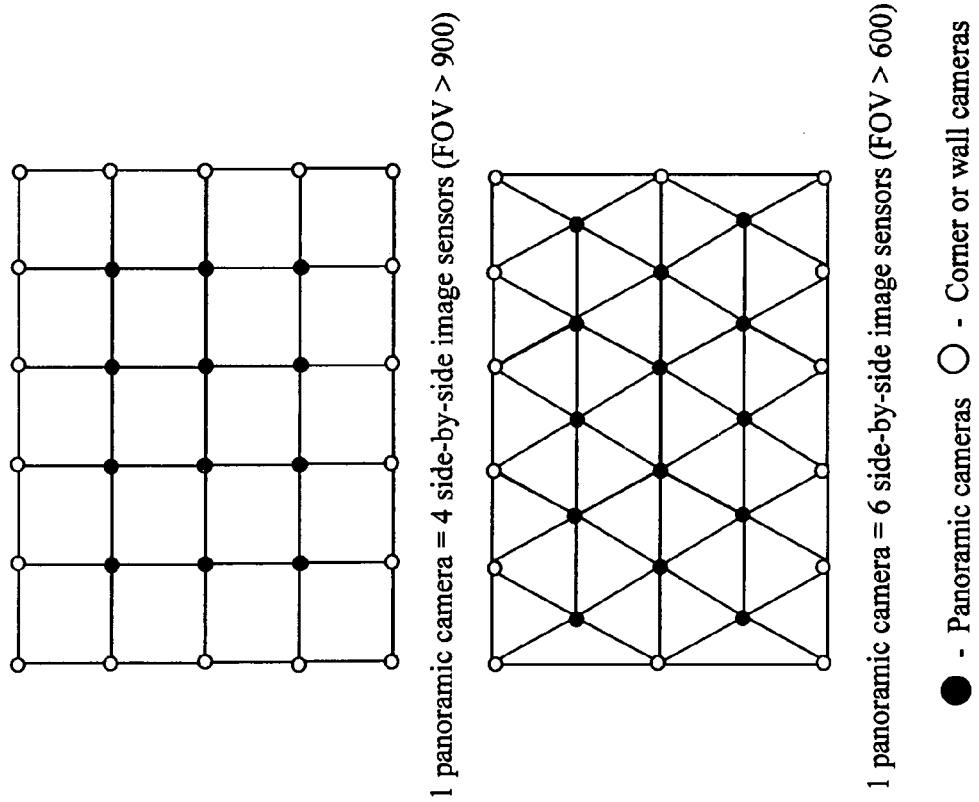
Figure 6. Mounting arrangement of the panoramic cameras in multi-camera surveillance system with complete area coverage.

MULTI-SENSOR PANORAMIC NETWORK CAMERA

CROSS REFERENCE TO RELATED APPLICATIONS

This application claims the benefit of U.S. Provisional Application No. 60/486,928, filed Jul. 14, 2003, the contents of which are incorporated by reference herein.

Also incorporated by reference herein are the following applications filed on even date herewith:

| Title | Priority Application |
|---|---|
| WIDE DYNAMIC RANGE NETWORK CAMERA | 60/486,929 |
| DUAL SPECTRAL BAND NETWORK CAMERA | 60/486,927 |
| DISTRIBUTED VIDEO SURVEILLANCE SYSTEM WITH SECURE REMOTE STORAGE OF ALARMED IMAGES AND REMOTELY ACCESSIBLE IMAGE ARCHIVES | 60/486,926 |
| HIGH-RESOLUTION NETWORK CAMERA WITH AUTOMATIC BANDWIDTH CONTROL | 60/486,930 |
| VIDEO SURVEILLANCE SYSTEM WITH TARGET PATH RECONSTRUCTION | 60/486,931 |

SUMMARY

The subject of this invention is a multi-sensor network camera providing up to 360 degrees angle of view. The camera disclosed in the present invention comprises multiple image sensors with individual optics, one or more image processors, compression units and network interfaces mounted in the single housing. In the preferred embodiment image sensors are positioned in non-parallel planes, cumulatively providing panoramic field of view. In the preferred embodiment image streams originating from all sensors share the same image compression and network interface hardware, providing for low cost implementation. In the preferred embodiment the images from all sensors are transmitted over the network simultaneously via packet interleaving, with appropriate bandwidth reduction achieved by image decimation. In one of the embodiments of this invention, simultaneously with transmission of decimated images from all sensors, full resolution window or entire image of one or more sensors is also transmitted, where the selection of contents is based either on motion detection or user setting.

In its preferred embodiment the present invention includes computer on the receiving end of the network interface and connected to the computer monitor, where said computer runs image processing and acquisition software configured to produce composite panoramic image by performing image "stitching", where said "stitching" is designed to eliminate image overlaps and to assemble composite panoramic image from images taken by different sensors of the panoramic camera.

BRIEF DESCRIPTION OF FIGURES

FIG. 1 depicts block diagram of panoramic network camera system;

FIGS. 2A-2C depict multi-sensor panoramic network camera head designs;

FIG. 3 depicts panoramic network camera cross-sections;

FIG. 4 depicts block diagram of multi-sensor panoramic network camera;

FIG. 5 depicts transmission and visualization of images from multi-sensor panoramic network camera;

FIG. 6 depicts mounting arrangement of panoramic cameras in multi-camera surveillance system with complete coverage of area under surveillance.

DETAILED DESCRIPTION

FIG. 1 shows a block diagram illustrating the main components of the multi-sensor panoramic network camera. The present invention is a multi-sensor network camera comprising two or more image sensors with individual optics (101), one or more image processors, network interface for transmission of the images off camera (104) and may comprise one or more memory buffers for temporary image storage, where said image sensors are positioned in non-parallel planes as to increase the cumulative field of view of the camera, said image processors may provide image sensor control, color processing and image compression and include at least one image processing module common to all image sensors (103), where said common to all sensors image processing module provides selection/multiplexing of the data stream to be output from the camera and may also be equipped with image compression engine.

In one embodiment of this invention, three or more image sensors (205) are positioned as to cumulatively provide 360 degrees field of view along at least one circumference with the center at the camera location 201 (FIG. 2A) and 202 (FIG. 2B). In another embodiment of this invention, two or more image sensors are positioned as to cumulatively provide 180 degrees field of view along at least one circumference with the center at the camera location 203 (FIG. 2C). In yet another embodiment of the present invention the sensors are mounted inside the camera as to provide cumulative field of view completely covering at least 180 degrees hemisphere centered on the camera (301 through 304). FIGS. 2 and 3 illustrate the examples of the arrangement of the image sensors in multi-sensor panoramic network camera. In each case illustrated, the image sensors are side-to-side with each other, but at different angles that together cover the desired field of view.

In one embodiment of the present invention, a camera contains one image processing/multiplexing module that is equipped to decimate and compresses the images from multiple sensors in a time-interleaved fashion and to submit them to the network interface or buffer in on-board image memory buffer. In one embodiment of this invention camera transmits over the network interface decimated images from some sensors and full resolution images from others, where image-processing module is configured to decimate images from one or more image sensors prior to compression while compressing full-resolution images or portions/windows of the images from one or more other image sensors.

In one embodiment of the present invention the image sensors are high-resolution CMOS image sensors. In another embodiment of this invention multiple image-processing units perform the image compression, where each said image-compression unit is configured to compress images from one of the image sensors in the camera. In the later embodiment, common to all image sensors image processor is equipped to perform the function of selection/multiplexing of compressed image streams to the network interface of the camera.

In one of the embodiments of the present invention the image-processing unit is equipped with motion detection and tracking capability, where image-processing unit can identify the moving target as it exits the field of view of one image sensor and enters the field of view of another. In the later embodiment the camera transmits over the network interface the un-decimated image window centered on the selected moving target and may also transmit decimated or un-decimated images from some or all of the sensors in the camera in a time-interleaved fashion where said interleaving may be performed on a frame-by-frame basis or on a packet-by-packet basis. In yet another embodiment of this invention the selection of the image streams to be transmitted off camera via network interface is performed by the user, where said selection is communicated to the camera via network interface.

A block diagram of an embodiment of the present invention is shown in FIG. 4. In this embodiment of the present invention, the multi-sensor panoramic network camera comprises multiple image sensors (403), image buffer memory (420 and 421), network interface (422 and 407) and ASIC or Field Programmable Gate Arrays (FPGAs) operating under control of low cost microprocessor (404), where said ASIC or FPGAs implement image pre (401) and post (402) processors in the form of massively parallel image processing pipeline executing time-critical operations on image pixels, where the flow of image pixels is operated on by the sequential stages of the pipeline with each pipeline stage operating in parallel with all or many of the other pipeline stages, while said microprocessor controls the operation of the image processing pipeline, performs image pipeline and network initialization operations, relatively slow operations (performed on a once-per-frame basis) associated with auto exposure, white balance, image stream multiplexing and protocol-level network interface computations as well as maintains the register space constituting the user interface to the camera.

In one embodiment of the present invention the output of each image sensor is processed in association with said image sensor image pre-processor. The image pre-processors are implemented as image processing pipelines that comprise multiple line memory buffers for 2-dimensional processing (408), block for interpolation of one-color-per-pixel Bayer pixel array into 3 color-per-pixel stream (409), block implementing image sharpening and low-light signal-to-noise improvement by applying high-pass and low-pass filters to the image (410), color correction block implementing the multiplication of the RGB pixel components by 3×3 color correction matrix (411), RGB to YUV transformation blocks (412 and 414), gamma correction block implemented as look-up table (416), as well as Auto Exposure (AE) (418) and Auto White Balance (AWB) (419) measurement engines that collect image brightness and color statistics required for AE and AWB algorithms, at least 2 frame buffers (420 and 421) and associated memory access controller (417) for assembly ping-pong buffering of processed and incoming frames.

In one embodiment of the present invention the image buffers storing the output of the image pre-processors are connected to a single image multiplexer and decimation block (429), where said block is in turn connected to the image post-processor (402).

In another embodiment of the present invention all image sensors are connected to the single image stream multiplexer and decimator that in turn is connected to the single image pre-processor, where said image pre-processor is then connected to a single post-processor. This embodiment allows low-cost implementation of the present invention due to resource sharing but, in general, has lower overall image processing and transmission bandwidth than that of the preferred embodiment.

In one embodiment of the present invention image post-processor (402) comprises pipelined JPEG image compression and network packet generation modules.

In one embodiment of the invention, pipelined implementation of JPEG compression includes blocks that perform MCU formation and buffering (428), Forward Discrete Cosine Transform (FDCT) (427), zigzag scan, quantization (426) and entropy coding (425). In one embodiment of the present invention 2-dimensional FDCT is implemented as two passes through 1-Dimensional FDCT transform, utilizing the fact that FDCT is a separable transformation.

In yet another embodiment of the present invention, more efficient image compression, such as JPEG2000 or MPEG-2 is substituted for baseline JPEG implementation.

In one embodiment of the present invention a modified version of Trivial File Transfer Protocol (TFTP—as described in RFC783) is implemented as the primary mode of image transmission, where TFTP protocol headers are formed and recorded in the transmit packet buffers (422) by the microprocessor (405), data fields of the TFTP packets, i.e. image data, along with the corresponding checksums are formed by the output stages of the image post-processor (423).

In one embodiment of the present invention, following the image compression, the image stream is stored in one of the three network packet buffers, where these buffers are arranged in such a way, that one buffer contains the packet currently being transmitted to the Media Access Control (MAC) Ethernet interface (407), one buffer contains a packet to be transmitted next and one buffer is available for storage of the compressed data coming out of the image compression module. This triple buffered arrangement guarantees that there is always a packet available for transmission, thus maximizing utilization of available network bandwidth and also facilitates re-transmission in the event of network errors.

In one embodiment of the present invention, microprocessor interfaced with image processing pipeline and Ethernet MAC and PHY hardware is also used to support a number of network protocols. In one embodiment, to reduce overall complexity of implementation, a minimal set of protocols consisting of UDP, TFTP, ARP, IP, and ICMP protocols are supported.

In another embodiment of the present invention TCP/IP and DHCP protocols are also supported.

In one embodiment the present invention includes a computer on the on the receiving end of the network interface and connected to the computer monitor (106), where said computer runs image processing and acquisition software configured to produce composite panoramic image by performing image "stitching", where said "stitching" is designed to eliminate image overlaps and to assemble a composite panoramic image from images taken by different sensors of the panoramic camera. In one embodiment of the present invention images from individual sensors of the panoramic camera are transmitted over the network in decimated (reduced resolution) mode. The visualization of multiple images acquired from multi-sensor panoramic camera as a single composite image displayed on the computer or other monitor is illustrated in FIG. 5.

In one embodiment of the present invention panoramic network camera is equipped to output both decimated and full resolution images and portions of images (windows). In one embodiment the computer software is also configured to display on the monitor full resolution image or portion of the image (502) to allow for instantaneous electronic zooming-in and inspection of the details of the panoramic image.

FIG. 6 illustrates exemplary mounting arrangements of the panoramic cameras in multi-camera surveillance system with complete area coverage. In one embodiment all image sensors mounted in the camera are high-resolution CMOS image sensors.

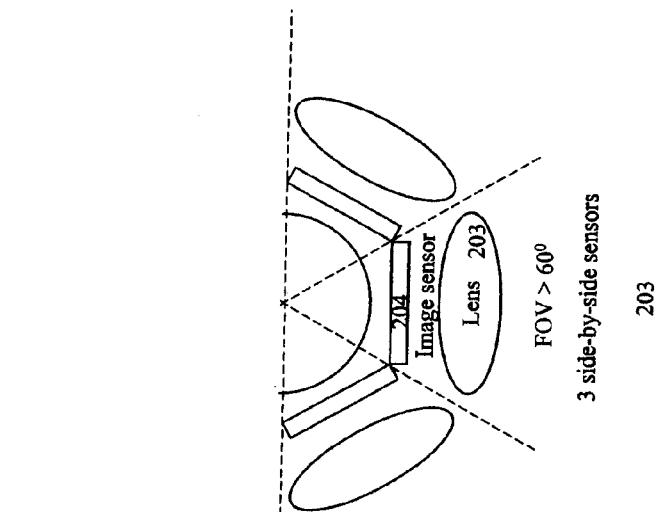
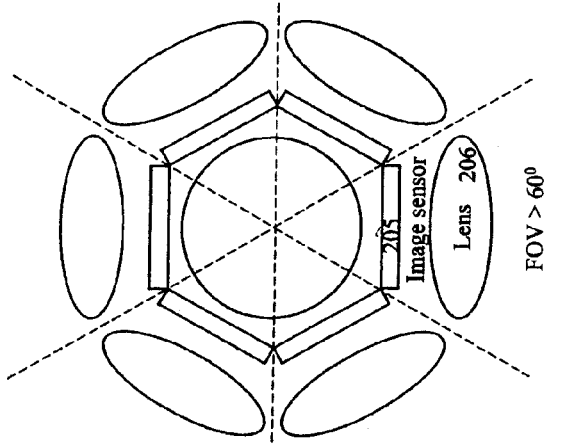
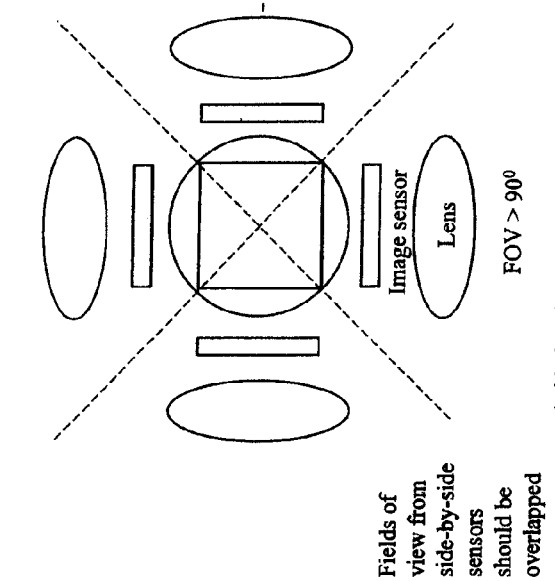

The invention claimed is:

1. A multi-sensor network camera comprising:
a plurality of image sensors, wherein focal planes of said image sensors are positioned at an angle to each other;
a plurality of image pre-processors each electrically coupled to a respective one of the plurality of sensors, wherein a number of images pre-processors is the same as a number of sensors, wherein each image pre-processor comprises a plurality of first pipelined hardware stages each including a Bayer interpolation hardware module, a color correction matrix transform hardware module, a white balancing color measurement hardware module, an automatic exposure luminance measurement hardware module and a plurality of hardware buffers, wherein flow of video stream pixels is operated on sequentially by said first pipeline hardware stages;
a multiplexor and decimation module for decimating high resolution video streams of a scene from the image sensors to generate low resolution video streams of said scene, and multiplexing said high resolution and said decimated low resolution video streams of said scene;
an image post-processor comprising a plurality of second pipelined hardware stages including a compression hardware module for compressing the high resolution video streams generated by the image sensors and the low resolution video streams from the multiplexor and decimation module, wherein flow of multiplexed video stream pixels is operated on sequentially by said second pipeline hardware stages;
a microprocessor coupled to the plurality of sensors, the plurality of image pre-processors and the image post-processor, wherein said microprocessor is configured to control the operation of the pipeline hardware stages, and to perform white balancing and auto exposure using data from said white balancing color measurement hardware module and said automatic exposure luminance measurement hardware module; and
a network interface for transmitting said compressed high resolution and said compressed low resolution video streams compressed by said compression hardware module via a computer network.

2. Multi-sensor network camera of claim 1, wherein each of said image sensors has individual optics or lens positioned in front of it.

3. Multi-sensor network camera of claim 1, wherein said image sensors are positioned in non-parallel planes as to cumulatively provide 360 degrees field of view along at least one circumference centered at the camera location.

4. Multi-sensor network camera of claim 1, wherein said image sensors are positioned as to provide cumulative field of view covering at least 180 degrees hemisphere centered at camera location.

5. Multi-sensor network camera of claim 1, wherein said network interface is Ethernet network interface.

6. Multi-sensor network camera of claim 1, wherein said network interface supports one or more of a group consisting of TCP, UDP, TFTP, and IP network protocols.

7. Multi-sensor network camera of claim 1, wherein said multiplexor and decimation module is a time-interleaved multiplexing means, wherein transmission of some portion of data stream from one of the said image sensors is followed by the transmission of some portion of data stream from another of said image sensors.

8. Multi-sensor network camera of claim 1, wherein said multiplexor and decimation module is configured to allow selection of the image data streams to be transmitted off camera to be controlled from an external input.

9. Multi-sensor network camera of claim 1, wherein said image sensors are CMOS image sensors with resolution in excess of 1 million pixels.

10. Multi-sensor network camera of claim 1, wherein said multiplexor and decimation module further generates high resolution windows of video streams of portions of said scene, and wherein the network interface transmits said compressed high resolution and said compressed low resolution video streams and said high resolution windows of video streams via the computer network at substantially a video rate.

11. Multi-sensor network camera of claim 1, wherein said multiplexor and decimation module are configured to deliver to said network interface said full resolution video streams if moving objects have been detected in a field of view of the image sensors and-said low resolution video streams if moving objects have not been detected in the field of view of the image sensors.

12. The multi-sensor network camera system of claim 1, further comprising a computer coupled to the computer network for receiving the images and configured to assemble received video streams into one composite video stream and display the composite video stream, wherein the computer is further configured to zoom in the received high resolution video streams.

* * * * *

UNITED STATES PATENT AND TRADEMARK OFFICE
CERTIFICATE OF CORRECTION

PATENT NO. : 7,680,192 B2 Page 1 of 2
APPLICATION NO. : 10/890912
DATED : March 16, 2010
INVENTOR(S) : Michael Kaplinsky It is certified that error appears in the above-identified patent and that said Letters Patent is hereby corrected as shown below:

On the Title Page

| | |
|---|---|
| Item (57) Abstract, line 2 | Delete "The includes", Insert --It includes-- |
| Item (57) Abstract, line 6 | Delete "providing panoramic field", Insert --providing a panoramic field-- |
| Item (57) Abstract, line 7 | Delete "sensors share", Insert --sensors that share-- |
| Item (57) Abstract, line 14 | Delete "also transmitted", Insert --also be transmitted-- |

In the Drawings

FIG. 2A, Sheet 2 of 6, left side of figure — Delete Drawing Sheet 2 and substitute therefore the Drawing Sheet consisting of Figs. 2A, 2B, and 2C as shown on the attached page Signed and Sealed this Thirtieth Day of November, 2010

David J. Kappos
*Director of the United States Patent and Trademark Office*